(12) United States Patent
Ryu

(10) Patent No.: US 7,905,657 B2
(45) Date of Patent: Mar. 15, 2011

(54) TEMPERATURE SENSOR

(75) Inventor: Je Il Ryu, Seoul (KR)

(73) Assignee: Hynix Semiconductor Inc., Icheon-si (KR)

( * ) Notice: Subject to any disclaimer, the term of this patent is extended or adjusted under 35 U.S.C. 154(b) by 488 days.

(21) Appl. No.: 12/117,699

(22) Filed: May 8, 2008

(65) Prior Publication Data

US 2009/0168841 A1  Jul. 2, 2009

(30) Foreign Application Priority Data

Dec. 28, 2007 (KR) .................. 10-2007-0140149

(51) Int. Cl.
*G01K 7/00* (2006.01)
(52) U.S. Cl. ........................ 374/178; 327/512
(58) Field of Classification Search .................. 374/178; 327/512
See application file for complete search history.

(56) References Cited

U.S. PATENT DOCUMENTS

| | | | | |
|---|---|---|---|---|
| 6,426,671 B1 * | 7/2002 | Kono | ............................. | 327/541 |
| 6,888,397 B2 * | 5/2005 | Tsuchiya | ..................... | 327/512 |
| 7,768,339 B2 * | 8/2010 | Suzuki | ........................... | 327/513 |
| 2003/0102901 A1 * | 6/2003 | Ooishi | .......................... | 327/512 |
| 2008/0192804 A1 * | 8/2008 | Ryu | .............................. | 374/178 |
| 2008/0291969 A1 * | 11/2008 | Chu | ............................... | 374/178 |

FOREIGN PATENT DOCUMENTS

| | | |
|---|---|---|
| KR | 1998-041375 | 8/1998 |
| KR | 1019990048860 A | 7/1999 |
| KR | 1020040065489 A | 7/2004 |
| KR | 1020070003046 A | 1/2007 |

* cited by examiner

*Primary Examiner* — Lisa M Caputo
*Assistant Examiner* — Mirellys Jagan
(74) *Attorney, Agent, or Firm* — Kilpatrick Townsend & Stockton LLP

(57) ABSTRACT

A temperature sensor that can be used in semiconductor devices includes a reference voltage generator for dividing a power supply voltage and outputting a reference voltage, a compare voltage generator for outputting compare voltages with different levels depending on a change of a control signal, a temperature voltage generator for generating a temperature voltage based on the reference voltage and a threshold voltage of a MOS transistor, and a comparator for comparing an amplified temperature voltage and the compare voltage.

21 Claims, 2 Drawing Sheets

TEMPERATURE SENSOR

CROSS-REFERENCES TO RELATED APPLICATIONS

The present application claims priority to Korean patent application number 10-2007-140149, filed on Dec. 28, 2007, which is incorporated by reference in its entirety.

BACKGROUND OF THE INVENTION

The present invention relates to a temperature sensor that can be used in semiconductor devices.

An operation of a semiconductor device is very sensitive to temperature change. In particular, as the process steps decrease and the level of integration increases, it is necessary to sense a change in temperature precisely.

In particular, in multi-chip packages (MCPs) and various application products, it is necessary to generate various signals which can supplement the performance of the chip at a specific temperature or higher from a user's viewpoint.

Conventional temperature sensing circuits include a circuit for sensing temperature using a bipolar junction transistor (BJT) component. However, respective skews of a BJT, CMOS, a resistor, etc. must be taken into consideration.

BRIEF SUMMARY OF THE INVENTION

The present invention provides a temperature sensor which can measure temperature precisely without using a BJT.

A temperature sensor according to an aspect of the present invention includes a reference voltage generator for dividing a power supply voltage and outputting a reference voltage, a compare voltage generator for outputting compare voltages with different levels depending on a change of a control signal, a temperature voltage generator for generating a temperature voltage based on the reference voltage and a threshold voltage of a MOS transistor, and a comparator for comparing an amplified temperature voltage and the compare voltage.

A temperature sensor according to another aspect of the present invention includes a reference voltage generator for dividing a power supply voltage and outputting a reference voltage, a compare voltage generator for outputting compare voltages with different levels depending on a change of a control signal, a temperature voltage generator for generating a temperature voltage based on the reference voltage and a threshold voltage of a MOS transistor, a comparator for comparing a K-times amplified voltage of the temperature voltage and the compare voltage, and a temperature sense signal output unit for outputting a temperature sense signal of a specific level according to an output signal of the comparator. The control signal is changed according to the temperature sense signal.

DESCRIPTION OF SPECIFIC EMBODIMENTS

A specific embodiment according to the present invention will be described with reference to the accompanying drawings. However, the present invention is not limited to the disclosed embodiment, but may be implemented in various manners. The embodiment is provided to complete the disclosure of the present invention and to allow those having ordinary skill in the art to understand the scope of the present invention. The present invention is defined by the category of the claims.

Figure 1:
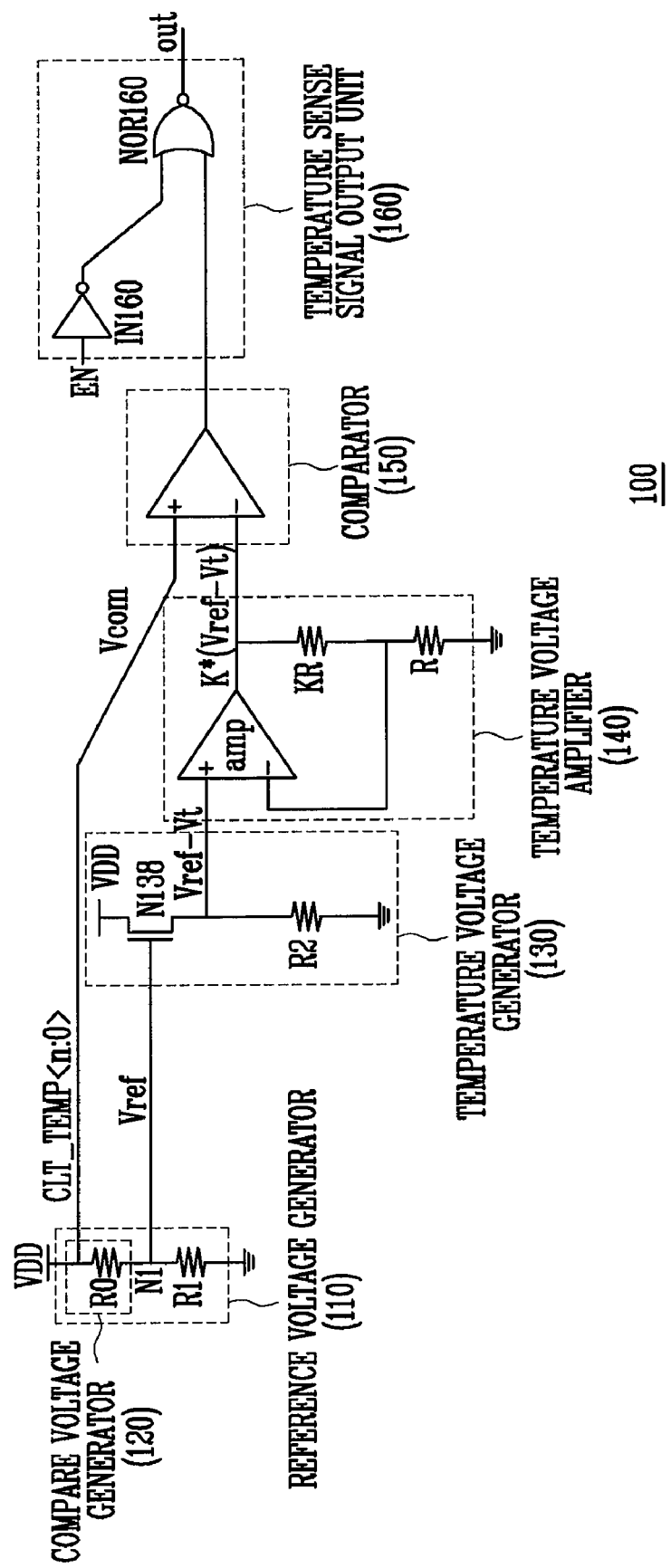
FIG. 1 is a circuit diagram showing a temperature sensor according to an embodiment of the present invention.

FIG. 1 is a circuit diagram showing a temperature sensor according to an embodiment of the present invention.

The temperature sensor includes a reference voltage generator 110, a compare voltage generator 120, a temperature voltage generator 130, a temperature voltage amplifier 140, a comparator 150, and a temperature sense signal output unit 160.

The reference voltage generator 110 outputs a constant reference voltage Vref irrespective of a temperature change. The reference voltage generator 110 includes resistors R0, R1 that are connected in series between a power supply voltage terminal VDD and a ground terminal. The reference voltage Vref is output from a connection node of the resistors, and the value of the reference voltage Vref is calculated by the following Equation 1.

$$V_{ref} = \frac{R1}{R0+R1} * VDD \quad \text{[Equation 1]}$$

The first resistor R0 is included in the compare voltage generator 120 and controls the level of a compare voltage in response to a control signal CTL_TEMP<n:0>. However, a total resistance value of the first resistor R0 maintains a constant value irrespective of the control signal. Thus, the reference voltage value is determined by Equation 1 irrespective of the control signal.

The compare voltage generator 120 generates a compare voltage, which will be compared with a temperature voltage amplified by the temperature voltage amplifier 140. The compare voltage generator 120 is described below in more detail with reference to the drawings.

Figure 2:
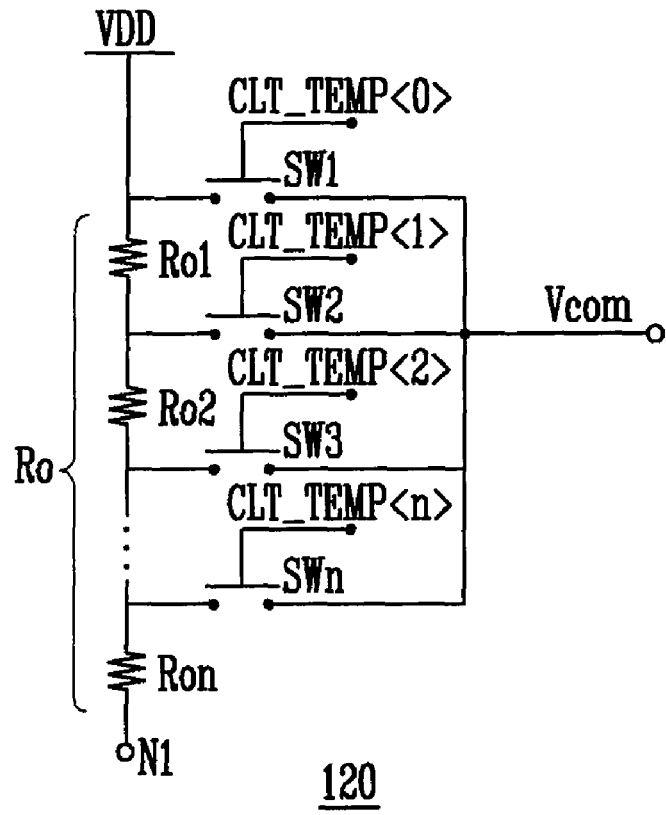
FIG. 2 is a circuit diagram showing a compare voltage generator according to an embodiment of the present invention.

FIG. 2 is a circuit diagram showing the compare voltage generator 120 according to an embodiment of the present invention.

The compare voltage generator 120 includes n resistors R01, R02, ..., R0n, which are connected in series. The compare voltage generator 120 further includes a plurality of switching elements SW1, SW2, ..., SWn. The switching elements are turned on in response to the control signals CTL_TEMP<n:0> and connected between connection nodes of the respective resistors and a compare voltage output terminal Vcom. That is, the first switching element SW1 is connected between the connection node of the power supply voltage terminal and the resistor R01, and the compare voltage output terminal Vcom. The second switching element SW2 is connected between the connection node of the resistor R01 and the resistor R02, and the compare voltage output terminal Vcom.

When a specific control signal CTL_TEMP<m> is applied, a corresponding switching element is turned on. The activated switching element outputs a voltage that is applied to a corresponding connection node as the compare voltage Vcom.

For example, when a control signal CTL_TEMP<1> is applied, the second switching element SW2 is turned on. Thus, voltage applied to the connection node of the resistor R01 and the resistor R02 is applied as the compare voltage Vcom.

The level of the compare voltage is calculated by the following Equation 2.

Assuming that a specific control signal CTL_TEMP<m> is applied, $$V_{com} = \frac{\sum_{i=m}^{n} R_{oi} + R1}{R0 + R1} * VDD \quad \text{[Equation 2]}$$

Although the connection node of the output terminal may be changed according to the control signals CTL_TEMP<n:0>, the connection relationship of the resistors R01, R02, . . . , R0n itself is not changed. Thus, the first resistor value Ro is not changed. Accordingly, even if the control signal CTL_TEMP<n:0> is changed, the reference voltage Vref is not changed.

Referring back to FIG. 1, the temperature voltage generator 130 generates a temperature voltage based on the reference voltage Vref and the threshold voltage of a MOS transistor, which varies according to temperature.

The temperature voltage generator 130 includes a NMOS transistor N130 having a gate to which the reference voltage Vref is applied and a drain connected to the power supply voltage terminal VDD. A resistor R2 is connected between a source terminal of the NMOS transistor N130 and a ground terminal.

Accordingly, since the reference voltage Vref is input to the gate of the NMOS transistor N130, a temperature voltage, which is the difference between the threshold voltage and the reference voltage (Vref−Vt), is output from the source terminal of the NMOS transistor N130.

The threshold voltage Vt becomes low when temperature rises, but becomes high when temperature decreases. Thus, the temperature voltage (Vref−Vt) increases when temperature rises, but decreases when temperature drops.

The temperature voltage amplifier 140 amplifies the temperature voltage K times.

The temperature voltage amplifier 140 includes an operational amplifier (OP amp). The OP amp includes a non-inverse terminal (+) to which the temperature voltage (Vref−Vt) is input, and a feedback resistor KR corresponding to K times of a resistor R. The resistor R is connected between an inverse terminal (−) of the OP amp and ground. The output value of the temperature voltage amplifier 140 becomes K*(Vref−Vt). Hence, an amplified temperature voltage can be identical to or higher than the temperature voltage according to the setting of the K value.

The comparator 150 compares the compare voltage Vcom and the amplified temperature voltage K*(Vref−Vt). The comparator 150 has a non-inverse terminal (+) to which the compare voltage Vcom is input, and an inverse terminal (−) to which the amplified temperature voltage K*(Vref−Vt) is input.

When the compare voltage is higher than the amplified temperature voltage, the comparator 150 outputs a high-level signal. When the compare voltage is lower than the amplified temperature voltage, the comparator 150 outputs a low-level signal.

In an alternative embodiment, the comparator 150 may have the inverse terminal (−) to which the compare voltage Vcom is input, and the non-inverse terminal (+) to which the amplified temperature voltage K*(Vref−Vt) is input.

In this case, when the compare voltage is higher than the amplified temperature voltage, the comparator 150 outputs a low-level signal, but when the compare voltage is lower than the amplified temperature voltage, the comparator 150 outputs a high-level signal.

The temperature sense signal output unit 160 outputs the temperature sense signal of a specific level according to the output of the comparator 150.

The temperature sense signal output unit 160 includes a NOR gate NOR160 to which an output signal of the comparator 150 and an inverted enable signal EN are input.

When the enable signal EN is a low level, the NOR gate NOR160 outputs a low-level signal irrespective of the output signal of the comparator 150.

In the case where the enable signal EN is a high level, when the output signal of the comparator is a high level (that is, the compare voltage is higher than the temperature voltage), the NOR gate NOR160 outputs a low-level signal. However, when the output signal of the comparator is a low level (that is, the compare voltage is lower than the temperature voltage), the NOR gate NOR160 outputs a high-level signal.

As described above, in the case where the comparator 150 has the inverse terminal (−) to which the compare voltage Vcom is input and the inverse terminal (+) to which the amplified temperature voltage K*(Vref−Vt) is input, an inverter (not shown) for inverting the output of the comparator 150 is further included.

In this case, since the output of the comparator is inverted by the inverter, the temperature sense signal output unit 160 can be used as shown in FIG. 1.

An operation of the temperature sensor according to the present invention is described below.

Figure 3:
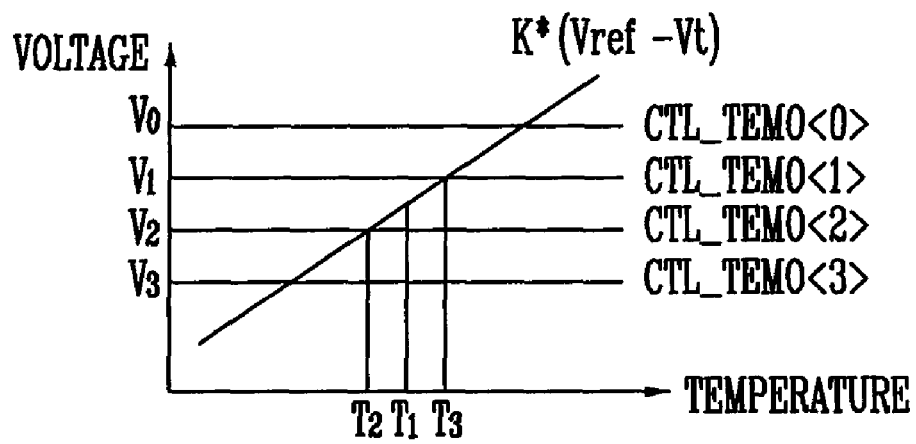
FIG. 3 is a graph illustrating an operation of the temperature sensor according to an embodiment of the present invention.

FIG. 3 is a graph illustrating an operation of the temperature sensor according to an embodiment of the present invention.

It is assumed that a current temperature is T1.

To measure temperature, when a control signal CTL_TEMP<0> is applied, the compare voltage Vcom becomes V0. In a current temperature state, the temperature sense signal will have a low-level value since the compare voltage is higher than the temperature voltage.

In order to lower the compare voltage, a control signal CTL_TEMP<1> of a next step is applied. The compare voltage becomes V1. Since the compare voltage is higher than the temperature voltage, the temperature sense signal will have a low-level value.

To lower the compare voltage, a control signal CTL_TEMP<2> of a next step is applied. The compare voltage becomes V2. Since the compare voltage is lower than the temperature voltage, the temperature sense signal will have a high-level value.

Thus, a determination is made that the current temperature is between T2 and T3.

If the number of the control signals and the number of the resistors included in the compare voltage generator 120 is increased, temperature can be measured more precisely.

As described above, according to the present invention, CMOS devices and resistors can be designed without a BJT. Accordingly, the miniaturization of skew can be maintained. Furthermore, the size of a sense circuit can be reduced when compared with an existing sense circuit, and an operating current can also be reduced.

The embodiments disclosed herein have been proposed to allow a person skilled in the art to easily implement the present invention, and the person skilled in the art may implement the present invention in various ways. Therefore, the scope of the present invention is not limited by or to the embodiment as described above, and should be construed to be defined only by the appended claims and their equivalents.

What is claimed is:

1. A temperature sensor, comprising:
   a reference voltage generator for dividing a power supply voltage and outputting a reference voltage;
   a compare voltage generator for outputting compare voltages with different levels depending on a change of a control signal;
   a temperature voltage generator for generating a temperature voltage based on the reference voltage and a threshold voltage of a MOS transistor; and
   a comparator for comparing an amplified temperature voltage and the compare voltage.

2. The temperature sensor of claim 1, wherein the reference voltage generator includes a first resistor and a second resistor, wherein the first resistor and the second resistor are connected in series between a power supply voltage terminal and a ground terminal.

3. The temperature sensor of claim 1, wherein the compare voltage generator comprises:
   a plurality of resistors connected in series between a power supply voltage terminal and an output terminal of the reference voltage generator; and
   a plurality of switching elements for outputting a voltage applied to a connection node of the respective resistors as the compare voltage according to the control signal.

4. The temperature sensor of claim 1, wherein the compare voltage is higher than the reference voltage.

5. The temperature sensor of claim 1, wherein:
   the reference voltage generator includes first and second resistors connected in series between a power supply voltage terminal and a ground terminal, and
   the first resistor includes a plurality of resistors connected in series between the power supply voltage terminal and an output terminal of the reference voltage generator.

6. The temperature sensor of claim 1, wherein the temperature voltage generator comprises:
   an NMOS transistor having a gate to which the reference voltage is input and a drain connected to a power supply voltage terminal; and
   a resistor connected between a source terminal of the NMOS transistor and a ground terminal.

7. The temperature sensor of claim 1, wherein the temperature voltage is substantially identical to a value that is a difference between the threshold voltage of the MOS transistor and the reference voltage.

8. The temperature sensor of claim 1, wherein the temperature voltage rises in proportion to an increase in temperature.

9. The temperature sensor of claim 1, wherein when the temperature voltage is lower than the compare voltage, the control signal is changed so that the compare voltage is lowered.

10. The temperature sensor of claim 1, further comprising a temperature voltage amplifier for amplifying the temperature voltage K times.

11. The temperature sensor of claim 10, wherein the temperature voltage amplifier comprises an operational amplifier, the operational amplifier comprising:
    a non-inverse terminal to which the temperature voltage is input, and
    a feedback resistor corresponding to K times of a resistor connected between an inverse terminal of the operational amplifier and a ground terminal.

12. The temperature sensor of claim 1, further comprising a temperature sense signal output unit for outputting a temperature sense signal of a specific level according to an output signal of the comparator, wherein the control signal is changed according to the temperature sense signal.

13. The temperature sensor of claim 12, wherein:
    the temperature sense signal output unit outputs a signal of a first level when the compare voltage is higher than the amplified temperature voltage, and
    the temperature sense signal output unit outputs a signal having a level opposite to the first level when the compare voltage is lower than the amplified temperature voltage.

14. The temperature sensor of claim 12, wherein when the temperature voltage is lower than the compare voltage, the control signal is changed so that the compare voltage is decreased according to the signal output from the temperature sense signal output unit.

15. A temperature sensor, comprising:
    a reference voltage generator for dividing a power supply voltage and outputting a reference voltage;
    a compare voltage generator for outputting compare voltages with different levels depending on a change of a control signal;
    a temperature voltage generator for generating a temperature voltage based on the reference voltage and a threshold voltage of a MOS transistor;
    a comparator for comparing a K-times amplified voltage of the temperature voltage and the compare voltage; and
    a temperature sense signal output unit for outputting a temperature sense signal of a specific level according to an output signal of the comparator,
    wherein the control signal is changed according to the temperature sense signal.

16. The temperature sensor of claim 15, wherein when the temperature voltage is lower than the compare voltage, the control signal is changed so that the compare voltage is lowered.

17. The temperature sensor of claim 15, wherein when the temperature voltage is lower than the compare voltage, the control signal is changed so that the compare voltage is decreased according to the temperature sense signal.

18. The temperature sensor of claim 15, wherein the temperature voltage is substantially identical to a value that is a difference between the threshold voltage of the MOS transistor and the reference voltage.

19. The temperature sensor of claim 15, wherein the temperature voltage rises in proportion to an increase in temperature.

20. The temperature sensor of claim 15, further comprising a temperature voltage amplifier for amplifying the temperature voltage K times.

21. The temperature sensor of claim 20, wherein the temperature voltage amplifier comprises an operational amplifier, the operational amplifier comprising:
    a non-inverse terminal to which the temperature voltage is input, and
    a feedback resistor corresponding to K times of a resistor connected between an inverse terminal of the operational amplifier and a ground terminal.

* * * * *